(12) United States Patent
Morikawa

(10) Patent No.: US 7,925,094 B2
(45) Date of Patent: Apr. 12, 2011

(54) SYSTEM, METHOD AND COMPUTER READABLE MEDIUM FOR ENCODING CURVES

(75) Inventor: Naoto Morikawa, Kanagawa (JP)

(73) Assignee: Naoto Morikawa, Kanagawa (JP)

( * ) Notice: Subject to any disclaimer, the term of this patent is extended or adjusted under 35 U.S.C. 154(b) by 952 days.

(21) Appl. No.: 11/772,248

(22) Filed: Jul. 2, 2007

(65) Prior Publication Data

US 2008/0008390 A1    Jan. 10, 2008

(30) Foreign Application Priority Data

Jul. 4, 2006  (JP) ................................ 2006-184977

(51) Int. Cl.
*G06K 9/46*    (2006.01)
(52) U.S. Cl. ........................................ 382/204; 382/232
(58) Field of Classification Search .................. 382/103, 382/151, 197, 203, 204, 232, 287, 316
See application file for complete search history.

(56) References Cited

FOREIGN PATENT DOCUMENTS

| WO | 02/101598 A | 12/2002 |
|---|---|---|
| WO | 03/040968 A1 | 5/2003 |

OTHER PUBLICATIONS

Article Titled "Geometric Compression Through Topological Surgery" jointly authored by Taubin et al., in ACM Transactions on Graphics, vol. 17, No. 2, Apr. 1998 (pp. 84-115).
Article Titled "Introduction to Protein Structure" jointly authored by Branden et al., in Introduction to Protein Structure, 2nd ed. U.S.A., Garland Publishing Inc., 1998 (pp. 9-10).
Article Titled "Differential Geometry and Polymer Conformation. 1. Comparison of Protein Conformations" jointly authored by Rackovsky et al., in American Chemical Society, 1978 (pp. 1168-1174).
Article Titled "Automatic Classification of Protein Structure by Using Gauss Integrals" jointly authored by Rogen et al., in Proc Natl Acad Sci, vol. 100, No. 1, Jan. 7, 2003 (pp. 119-124).

*Primary Examiner* — Daniel G Mariam
(74) *Attorney, Agent, or Firm* — Jianq Chyun IP Office

(57) ABSTRACT

A computer readable medium storing thereon a program for encoding the conformation of a given curve is provided. The encoding program includes: a point selection module for selecting representative points on a given curve; an arrangement module for putting an elemental structure block which consists of a trunk and branches; a branch selection module for selecting a branch from each of the blocks arranged above; an adjustment module for adjusting spacial orientation of the elemental structure blocks arranged above, just after selection of the most appropriate branch of a block (current block) and before selection of the most appropriate branch of the block assigned to the next representative point (next block); and a code generator module for generating data which describe the conformation of the curve, using the code of the selected branches of the elemental structure blocks assigned to the representative points of the curve.

20 Claims, 15 Drawing Sheets

(A)

(B)

(C)

(D)

(E)

CODE : 0-0-0-0-0-1-1-0-0-0

(A)

(B)

(C)

(D)

(E)

CODE: 0-1-1-0-0-1-0-1-1

(A)

(B)

(C)

(D)

(E)

CODE : 0-0-0-0-0-0-0-0-0-0-1-1-1-1

(A)

(B)

(C)

(D)

(A)

(B)

US 7,925,094 B2

SYSTEM, METHOD AND COMPUTER READABLE MEDIUM FOR ENCODING CURVES

This patent application claims priority from a Japanese patent application No. 2006-184977 filed on Jul. 4, 2006, the contents of which are incorporated herein by reference.

BACKGROUND

1. Technical Field

The present invention relates to a system, a method and a computer readable medium for encoding a curve. In particular, this invention relates to a computer readable medium storing encoding programs which encode the conformations, i.e., spacial patterns, of curves.

2. Related Art

The function of a protein is determined by the three-dimensional structure of the protein. Thus, once three-dimensional structures are represented in a simple way, one could compare structural similarity of proteins using the data, instead of the complicated three-dimensional structures.

As a representation method of the shapes of three-dimensional objects, there are two known ways: one approximates the shape of an object using a combination of predetermined primitive objects (such as cuboids, spheres, and cylinders), the other uses polygon-meshes to approximate the surface of an object. As an example of approximation by primitive objects, WO02/101598 and WO03/040968 propose an encoding method of the conformations of curves in (N−1)-dimensional Euclidean space, where curves are approximated by a sequence of N-face polyhedrons and the conformation of a curve is described as a binary sequence (N denotes any natural number greater than 1).

As for mathematical representations of the backbone conformations of biopolymer molecules such as proteins, there are three known methods: C. Branden and J. Tooze, "Introduction to Protein Structure," Garland Publishing Inc, New York (USA), 1998, pp. 9-10 explains the Ramachandran plot method, where the two backbone dihedral angles (the angle of rotation around the N—Ca bond and the angle around the C'—Ca bond from the same Ca atom) are plotted against each other in a two-dimensional diagram to characterize protein structures such as alpha-helices and beta-sheets. S. Rackovsky, H. A. Scheranga, "Differential Geometry and Polymer Conformation. 1.," Macromolecules, 1978, 1168-1174 proposed a differential geometrical method, where protein backbones are approximated by a broken line to quantify the structural similarity of different proteins. P. Rogen, B. Fain, "Automatic classification of protein structure by using Gauss integrals," Proc. Natl. Acad. Sci., 2003, 100, 119-124 proposed a topological method, where protein structures are described using 30 geometrical parameters for the purpose of classification.

Finally, WO03/040968 proposed an encoding method of three-dimensional biopolymer molecule structures (such as protein structures), where a biopolymer is approximated by a sequence of tetrahedrons and its conformation is represented by a binary sequence. Since the method makes it possible to describe the three-dimensional structures of biopolymers as one-dimensional number sequences, one could compute structural similarity of different polymers simply by comparing the corresponding number sequences.

SUMMARY

When one encodes the backbone conformations of biopolymer molecules such as proteins, it is desirable to encode local structures precisely. For example, it is desirable for a system, which implements a backbone conformation encoding method, to generate codes which detect small differences of the backbone conformations of different proteins precisely.

Therefore, it is an object of an aspect of the present invention to provide a system, a method and a storage medium, which are capable of overcoming the above drawbacks accompanying the related art. The above and other objects can be achieved by combinations described in the independent claims. The dependent claims define further advantageous and exemplary combinations of the present invention.

Thus, one aspect of the present invention provides a computer readable storage medium. The storage medium includes a program for encoding the conformation of a given curve. The encoding program includes a point selection module for selecting representative points on a given curve; an arrangement module for putting an elemental structure block which consists of a trunk and branches, where each branch is connected to the same end point of the trunk in a predetermined configuration and assigned a different code, on each of the representative points in such a way that the connection point of the trunk and branches of the block coincides with the position of the corresponding representative point; a branch selection module for selecting a branch from each of the blocks arranged above, successively along the curve starting from the first representative point to the last representative point, which represents the gradient of the curve at the corresponding representative point most appropriately; an adjustment module for adjusting spacial orientation of the elemental structure blocks arranged above, just after selection of the most appropriate branch of a block (current block) and before selection of the most appropriate branch of the block assigned to the next representative point (next block), in such a way that the direction and rotational orientation of the trunk of the next block coincide with the predetermined direction and rotational orientation assigned to the selected branch of the current block; and a code generator module for generating data which describe the conformation of the curve, using the code of the selected branches of the elemental structure blocks assigned to the representative points of the curve.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

The invention will now be described based on preferred embodiments, which are not intended to limit the scope of the invention, but to exemplify the invention. All of the features and the combinations thereof described in the embodiments are not necessarily essential to the invention.

Figure 1:
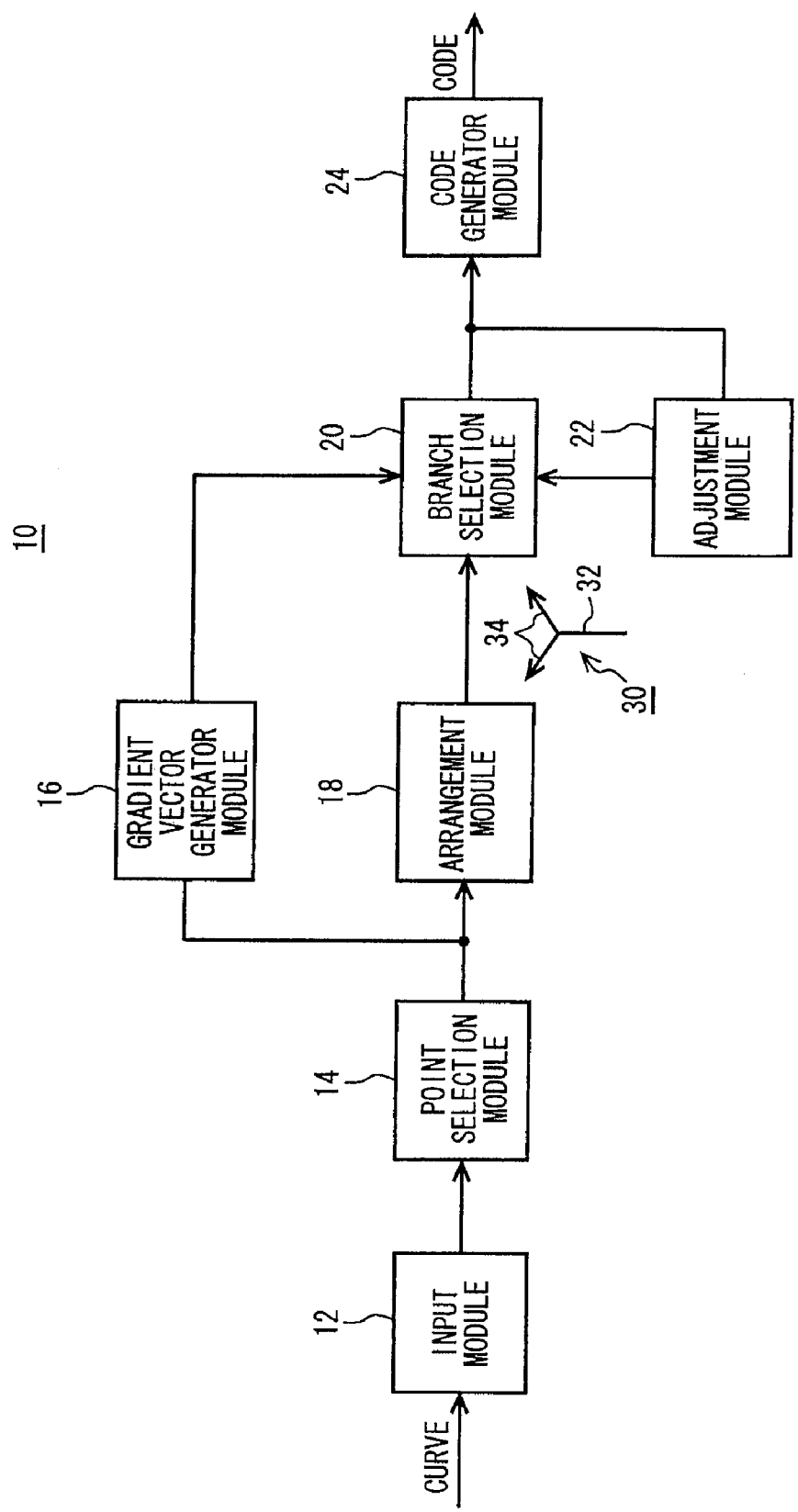
FIG. 1 shows the organization of an encoding system 10 embodying the invention.

FIG. 1 shows the organization of an encoding system 10 embodying the invention. The encoding system 10 is composed of an input module 12, a point selection module 14, a gradient vector generator module 16, an arrangement module 18, a branch selection module 20, an adjustment module 22, and a code generator module 24.

The encoding system 10 encodes the conformation of a given curve into a sequence of codes, such as a sequence of binary numbers. That is, the encoding system 10 is capable of generating a code sequence which represents the conformation of a curve or variation of the local structures of the curve. As a result, one could compute structural similarity of different curves by comparing the corresponding code sequences generated by the system 10. For example, one could use the encoding system 10 to encode the conformations of backbone structures of biopolymer molecules such as proteins for the purpose of classification or data retrieval.

The input module 12 receives the data of a target curve. For example, the module 12 receives two- or three-dimensional coordinates of points on the curve. The point selection module 14 selects representative points on the curve received by the input module 12. For example, the point selection module 14 may select ordered points on the curve arranged from one end to the other end. Then, the point selection module 14 may store data which specify the order of point representative points as well as data which specify the position of the point.

The gradient vector generator module 16 assigns a gradient vector to each of the representative points selected by the point selection module 14 above. For example, the gradient vector generator module 16 may assign the direction from the current point to the next point, as gradient vector to the current point. Or the gradient vector generator module 16 may assign a vector which is parallel to the gradient vector of the curve at the current point and its direction goes from the current point to the next point, as gradient vector to the current point. And the gradient vector generator module 16 may compute data which specify the gradient vectors assigned to the representative points and store the data, coupled with another data which specify the corresponding representative point.

The arrangement module 18 puts an elemental structure block 30 which consists of a trunk 32 and branches 34, where each branch is connected to the same end point of the trunk 32 in a predetermined configuration and assigned a different code, on each of the representative points in such a way that the connection point of the trunk 32 and branches 34 of a block 30 coincides with the position of the corresponding representative point. For example, the arrangement module 18 may compute the length, position, direction, and rotational orientation of the trunk 32 as data which specify the spacial orientation of the trunk 12 within a block 30. Then, the arrangement module 18 may store the data, coupled with another data which specify the corresponding representative point. And the arrangement module 18 may compute the length and relative arrangement (position and direction with respect to the trunk 32) of each branch 32, the direction (direction vector) assigned to each branch 34 which may be different from the direction of itself, the predetermined rotational orientation of each branch 32, and the code assigned to each branch 34 as data which specify the branches 34 of a block 30. Then, the arrangement module 18 may store the data, coupled with another data which specify the corresponding representative point.

Finally, the arrangement module 18 puts an elemental structure block 30 on each of the representative points in such a way that the position of a block 30 and the corresponding representative point coincide. And the arrangement module 18 may store data which specify the spacial orientation of the arranged blocks 30, coupled with another data which specify the position of the corresponding representative point.

The branch selection module 20 selects representative points one by one along the curve starting from the first representative point to the last representative point. For each representative point, the branch selection module 20 selects a branch, from the branches of the elemental structure block 30 assigned to the point, which represents the gradient of the curve at the point most appropriately. For example, the branch selection module 20 may select the branch 34, of a block 30, which is assigned a direction vector whose direction is closer to the direction of the gradient vector of the curve at the point than that of the other branches' direction vectors. The branch selection module 20 may compare the data which specify the directions of the branches 34 of an elemental structure block 30 with the data which specify the direction of the gradient vector of the curve at the corresponding point, to choose the branch 34 whose direction is closer the direction of the gradient vector of the curve at the point than that of the other branches. Then, the branch selection module 20 stores the code assigned to the selected branch 34 as the code associated with the corresponding representative point.

The adjustment module 22 adjusts direction and rotational orientation of the elemental structure blocks 30 arranged above, just after selection of the most appropriate branch 34 of a block 30 (current block) by the branch selection module 20 and before selection of the most appropriate branch 34 of the block 30 assigned to the next representative point (next block) by the branch selection module 20, in such a way that the direction and rotational orientation of the trunk 32 of the next block 30 coincide with the predetermined direction (direction vector) and rotational orientation of the selected branch 34 of the current block 30. For example, the adjustment module 22 may firstly modify the data which specify the spacial orientation of a block 30 (current block) in such a way that the predetermined direction assigned to the selected branch 34 of the block 30 coincides with the gradient vector of the curve at the corresponding representative point. Secondly the adjustment module 22 may modify the data which specify the spacial orientation of the next block 30 in such a way that the direction and rotational orientation of the trunk 32 of the next block 30 coincide with the predetermined direction (direction vector) and rotational orientation assigned to the selected branch 34 of the current block 30.

The code generator module 24 generates data which describe the conformation of the curve, using the code of the selected branches 34 of the elemental structure blocks 30 arranged on the curve. For example, the code generator module 20 may arrange the codes of the selected branches 34 in the order that the corresponding representative points occur on the curve and output the obtained sequence of codes, as data which describe the conformation of the curve. Using the encoding system 10 described above, one could describe the local structure of the conformation of a curve precisely with data of a simple structure. And the encoding system 10 could generate codes of curves which detect differences of conformations precisely.

FIG. 2(A) shows an example of the elemental structure block 30 embodying the embodiment. FIG. 2(B) shows an example of the block 30, where the first branch 34-1 is selected. And FIG. 2(C) shows an example of the block 30, where the second branch 34-2 is selected.

Figure 2:
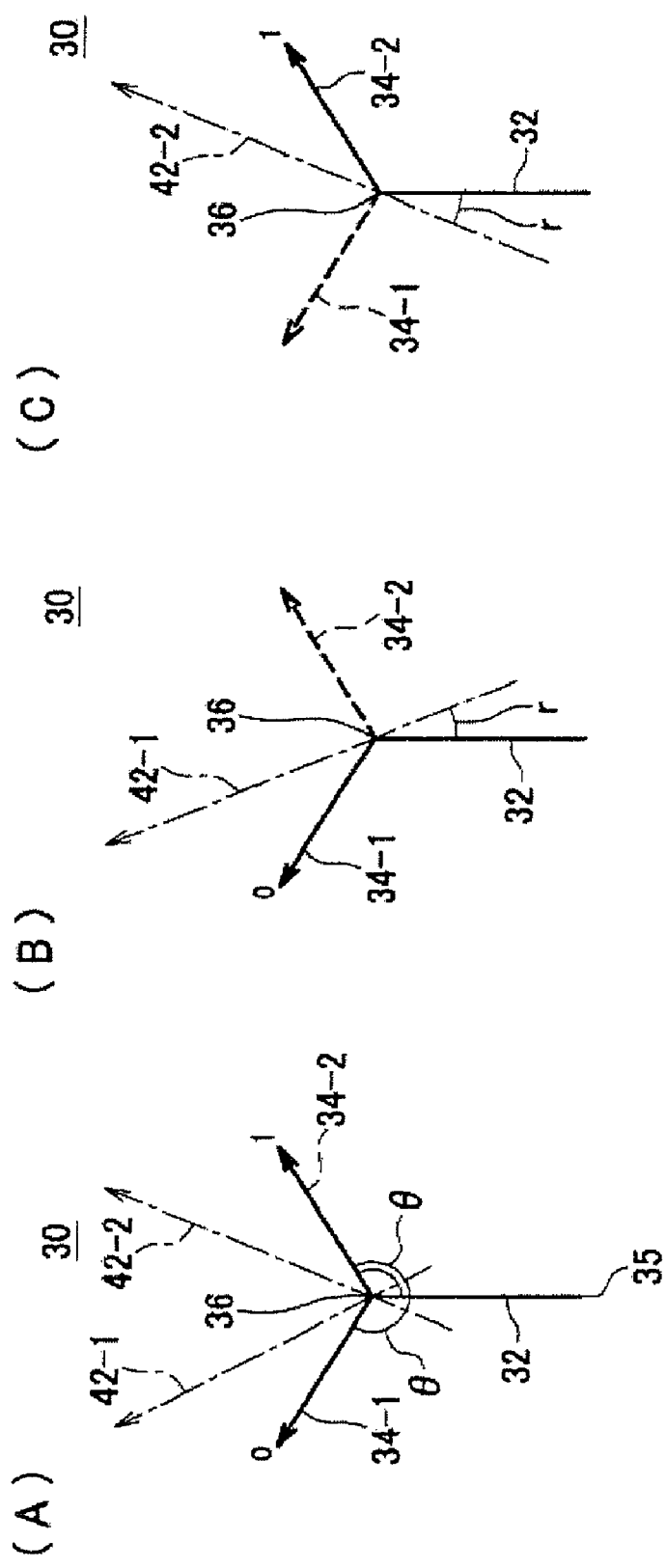
FIGS. 2(A)-2(C) show an example of the elemental structure block 30 used in the embodiment.

The branch selection module 20 may use the block 30 shown in FIG. 2 to encode the conformation of curves in two-dimensional Euclidean space (i.e., plane curves). The elemental structure block 30 embodying the embodiment is two-dimensional and has a trunk 32 and two branches 34 (the first one 34-1 and the second one 34-2) as shown in FIG. 2. The trunk 32 is a line segment of predefined length. The two branches 34 are also line segments of predefined lengths. (For example, the length of the branches may be the same as the length of the trunk 32.) The two branches 34 have one of their end points coincided with an end point 36 of the trunk 32. The first branch 34-1 assumes a predetermined position with respect to the trunk 32 and the second branch 34-2 assumes another predetermined position with respect to the trunk 32, where the angle formed by first branch 34-1 and the trunk 32 may be equal to the angle formed by the second branch 34-2 and the trunk 32. For example, both of the angles may be 120 degrees.

Moreover, each of the branches 34 of the block 30 embodying the embodiment is assigned a direction vector 42; the first direction vector 42-1 to the first branch 34-1 and the second direction vector 42-2 to the second branch 34-2. A block 30 is assigned the direction specified by the first direction vector 42-1 when the first branch 34-1 is selected. And a block 30 is assigned the direction specified by the second direction vector 42-2 when the second branch 34-2 is selected. For example, the first direction vector 42-1 may be arranged as shown in FIG. 2(B), forming a predetermined angle with the trunk 32. And the second direction vector 42-2 may be arranged differently as shown in FIG. 2(c), forming a predetermined angle with the trunk 32. (The angle formed by the vector 42-1 and the trunk 32 may be equal to the angle formed by the vector 42-2 and the trunk 32.)

Each of the branches 34 of the block 30 embodying the embodiment is also assigned a code; code 0 to one branch and code 1 to the other branch. And the encoding system 10 could generate a binary sequence of 0 and 1 which describes the conformation of a given plane curve, using the elemental structure blocks 30.

The block 30 may be specified by a set of data which includes the length, position, and direction of the trunk 32, the length of the branches 34, relative position and direction 32 of the branches 34 with respect to the trunk 32, relative direction of direction vectors 42 with respect to the trunk 32, and the codes assigned to the branches 34. The encoding system 10 may encode a plane curve 50, using the data which specify the block 30.

Figure 3:
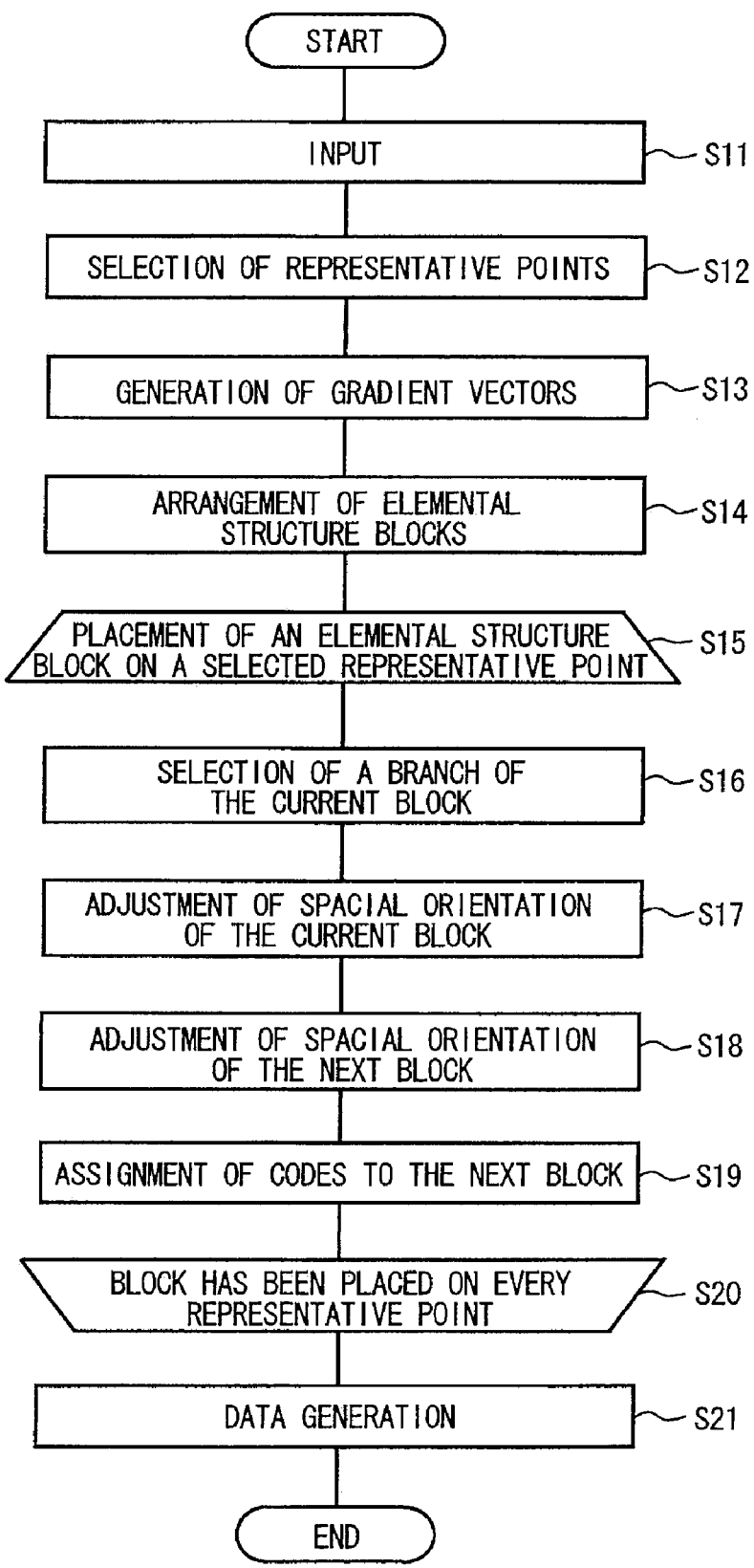
FIG. 3 shows the encoding procedure performed by the encoding system 10 used in the embodiment.
Figure 4:
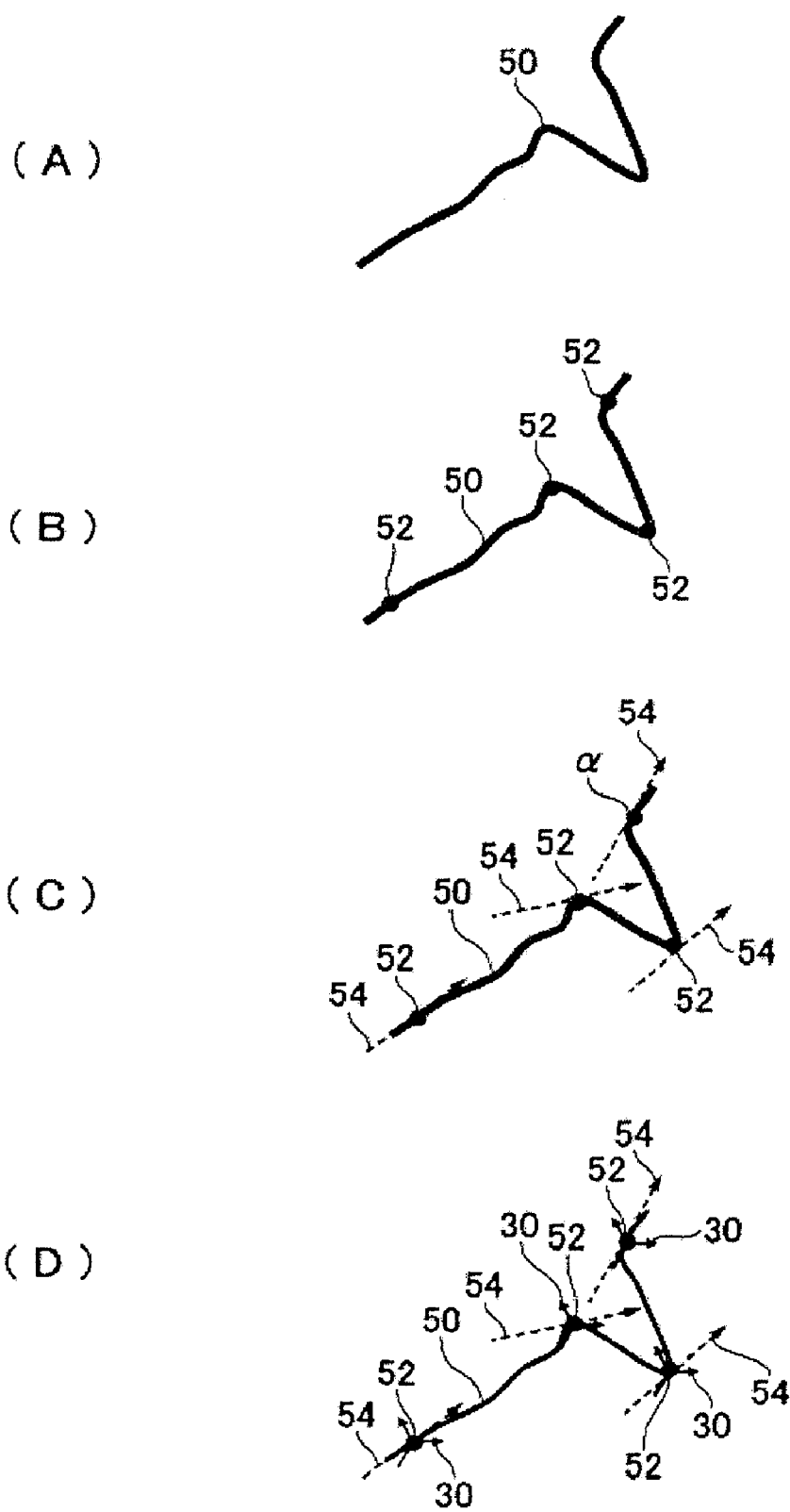
FIGS. 4(A)-4(D) show an example of the procedures S11, S12, . . . , S14 in FIG. 3.
Figure 5:
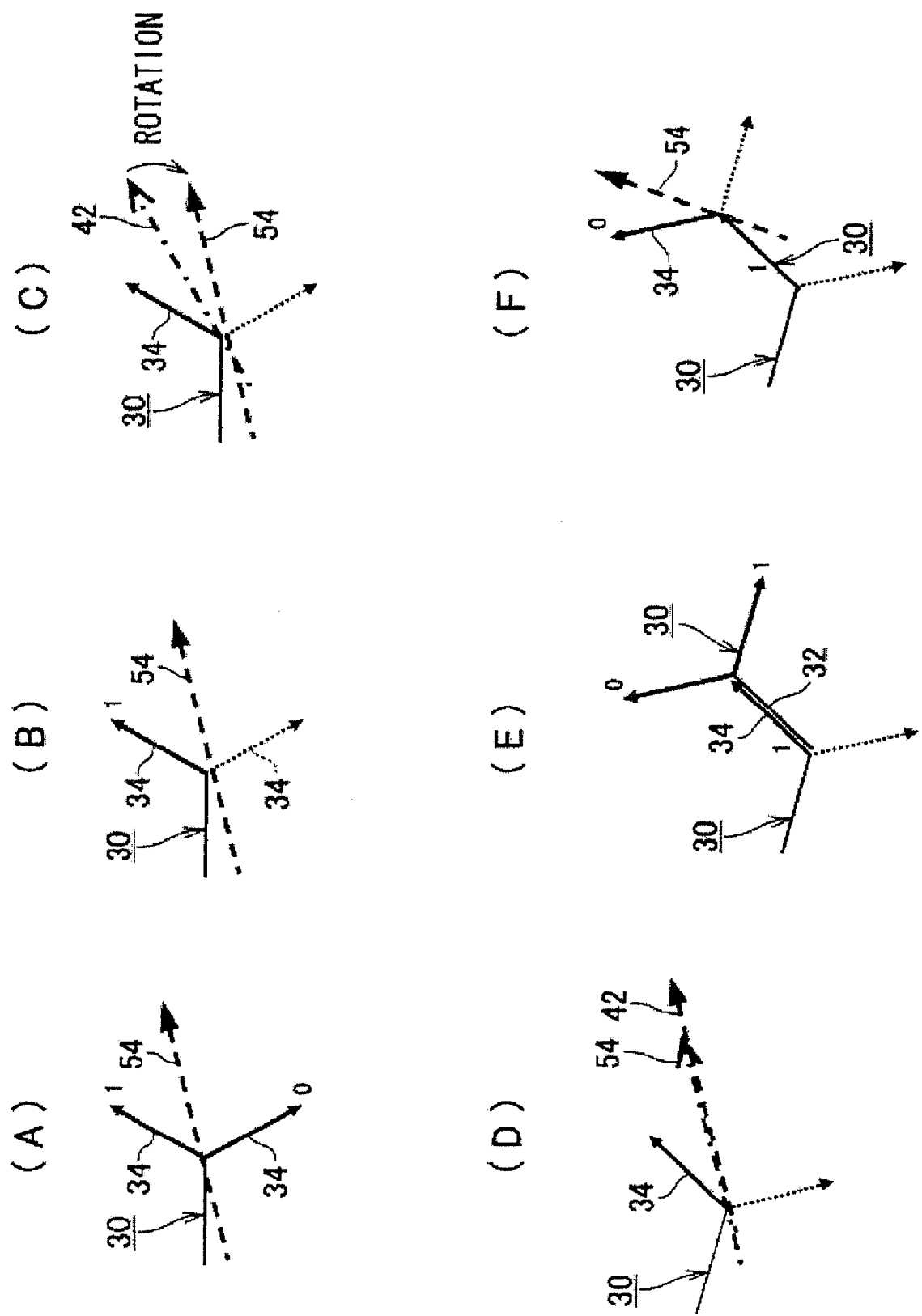
FIGS. 5(A)-5(F) show an example of the procedures S16, S17, . . . , S19 in FIG. 3.

FIG. 3 shows the encoding procedure performed by the encoding system 10 for the embodiment of this invention. FIG. 4(A) shows an example of a curve, curve 50, received in input step S1. FIG. 4(B) shows the representative points 52 of the curve 50 selected in step S12. FIG. 4(C) shows the gradient vectors 54 generated at the representative points 52 of the curve 50 in step S13. FIG. 4(D) shows the elemental structure blocks 30 arranged on the representative points 52 of the curve 50 in step S14. FIG. 5(A) shows an example of an elemental structure block 30 and the gradient vectors 54 assigned to the corresponding representative point 52. FIG. 5(B) shows the block 30, where one of the branches 34 has been selected in step S16. FIG. 5(C) shows an example of adjustment of a direction vector 42 in step 17. FIG. 5(D) shows the block 30 after the adjustment in step S17. FIG. 5(E) shows an example of arrangement of a block 30 and the next block 30 after adjustment in step S18. FIG. 5(F) shows the arrangement of a block 30 and the next block 30, where one of the branches 34 of the next block 30 has been selected in step S16.

First of all, the input module 12 receives a curve 50 to be encoded (S11, FIG. (A)). And the point selection module 14 selects representative points 52 on the curve 50 (S12, FIG. (B)). Then, the gradient vector generator module 16 computes a gradient vector 54 for each of the representative points 52 selected above (S13, FIG. (C)). And the arrangement module 18 put an elemental structure block 30 on each of the selected points 52(S14, FIG. 4(D)).

Next, the branch selection module 20 and the adjustment module 22 adjust spacial orientation of the blocks 30 assigned to the points 52 one by one, in the order the corresponding points occur on the curve 50. In particular, the two modules 20 and 22 perform the following procedures, from S16 to S19.

The branch selection module 20 selects a branch 34, from the branches 34 of a block 30, which is closer to the gradient vector 54 of the block 30 than the others (S16, FIGS. 5(A) and (B)). For example, in the case of FIGS. 5(A) and (B), the branch selection module 20 selects the branch 34 which is assigned a direction vector 54 and code 1 because the branch 34 is closer to the gradient vector 54 than the other branch 34 which is assigned another direction vector 54 and code 0. And the branch selection module 20 stores the code assigned to the selected branch 34. For example, in the case of FIGS. 5(A) and (B), the branch selection module 20 stores code 1.

Next, the adjustment module 22 rotates the block 30 around the connection point of the trunk 32 and the branches 34 until the direction vector 42 assigned to the branch 34 selected in step S16 and the gradient vector 54 of the corresponding representative point 52 computed in step S13 become parallel to each other (S17, FIGS. 5(C) and (D)). And the adjustment module 22 aligns the next block 30, i.e., a block assigned to the next representative point, with the current block 30 in such a way that the direction of the trunk 32 of the next block 30 and the direction of the branch 34 of the current block 30 selected in step 16 coincide (S18, FIG. 5(E)). The adjustment module 22 may put the block 30 assigned to the first representative point in a predetermined way.

Then, the adjustment module 22 assigns a code to each of the branches 34 of the next block 30 (S19), where the code-to-branch mapping of the next block 30 is different from that of the current block 30. That is, the adjustment module 22 assigns code 1 to a branch 34 of the next block 30 if the same branch 34 of the current block 30 is assigned code 0. And the adjustment module 22 assigns code 0 to a branch 34 of the next block 30 if the same branch 34 of the current block 30 is assigned code 1. The adjustment module 22 may assign codes to the branches 34 of the block 30 assigned to the first representative point 52 in a predetermined way.

After step S19, the branch selection module 20 selects the block 30 assigned to the next point 54 and the encoding process returns to the branch selection step S16 (S20, S15, and FIG. 5(F)). After processing the block 30 assigned to the last point 52 (S20), the code generator module 24 generates data which describes the conformation of the target curve 50, using the codes assigned to the branches 34 selected by the branch selection module 20 (S20). For example, the code generator module 24 may generate a sequence of code obtained by arranging the codes assigned to the selected branches of the blocks 30 in the order that the corresponding points 52 occur on the curve 50. That is, the code generator module 24 may generate a binary sequence of 0 and 1 which describe the conformation of a target plane curve 50.

Using the encoding system 10 described above, one could generate data which describe the conformation of a given curve precisely. In the above, the encoding system 10 performs the loop of steps S16, S17, . . . , and S20 after selection of all representative points 52 (S12), generation of a gradient vector 54 for each of all the selected points 52 (S13), and arrangement of an elemental structure block on all the selected points 52 (S14). Instead, the encoding system 10 may perform selection of a next representative point 52, generation of a gradient vector 54 of the selected point 52, and placing of a block 30 on the selected point 52 after selection of a branch step (S16).

Figure 6:
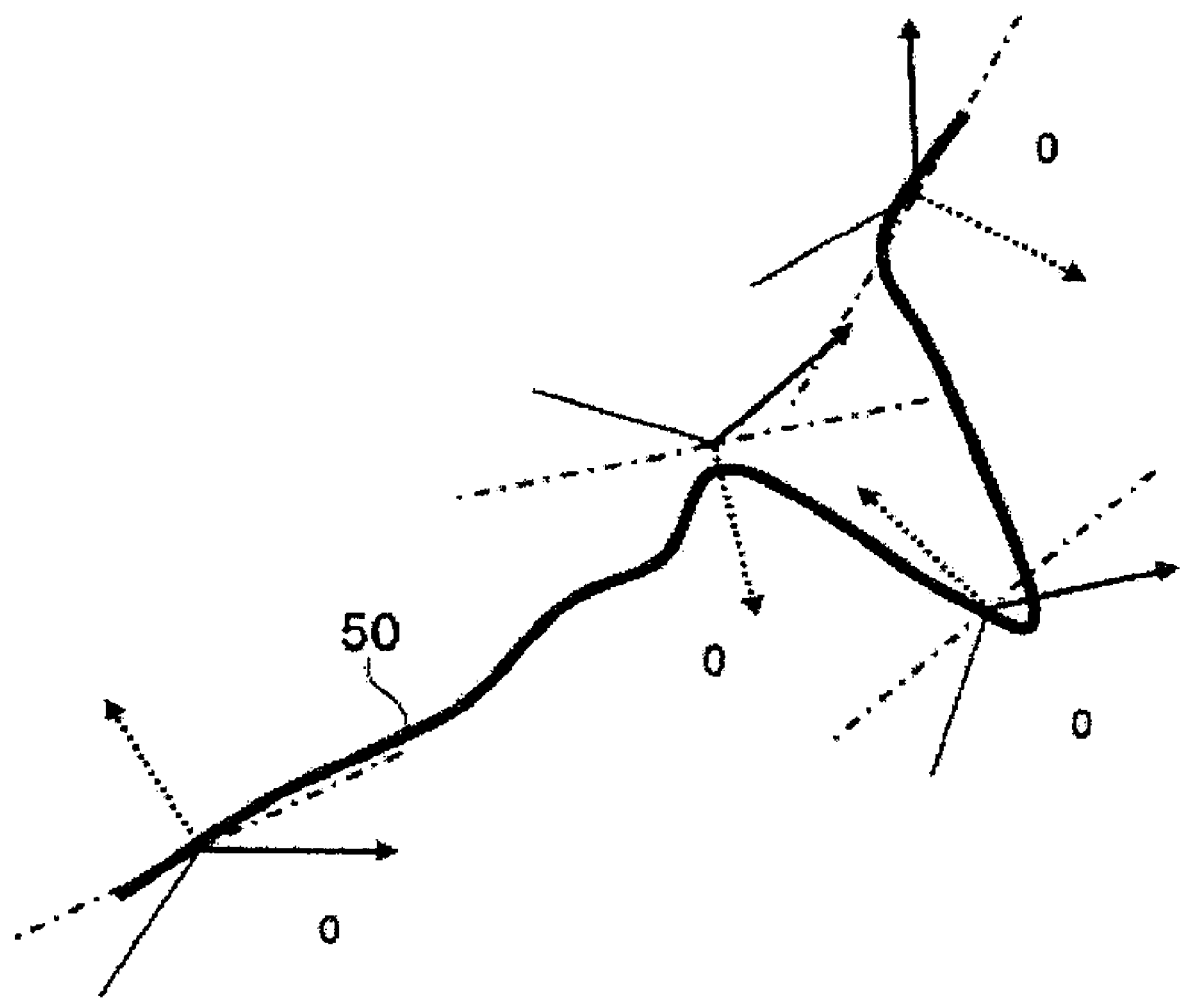
FIG. 6 shows an example of encoding result of a curve 50, where representative points are selected discretely.

FIG. 6 shows an example of encoding result of a curve 50, where representative points are selected discretely. The point selection module 14 selects representative points on the curve 50 in a predetermined way. For example, the point selection module 14 may select points which are arranged at predetermined intervals from an end point to the other end on the curve 50, where the intervals may be different from each other as in the case of the example shown in FIG. 6. The longer the intervals become, the smaller the code generated by the encoding system 10 becomes. And one could compare the conformation of curves more roughly using a smaller code, since the smaller code describes the less precise conformation of curves.

Figure 7:
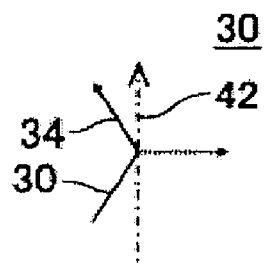
FIGS. 7(A)-7(E) show an example of an elemental structure block 30, an arrangement, broken lines 56, and an output binary sequence thereof, where the direction of the direction vector 42 assigned to a branch 34 is not equal to the direction of the trunk 32 nor to the direction of the branch 34 itself.
Figure 7:
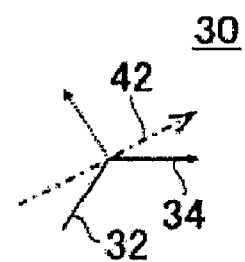
Figure 7:
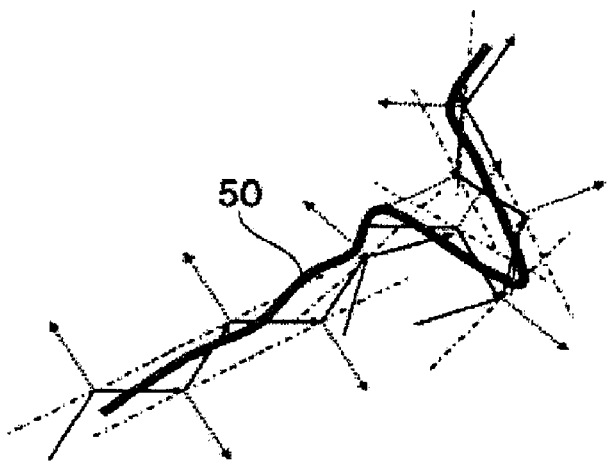
Figure 7:
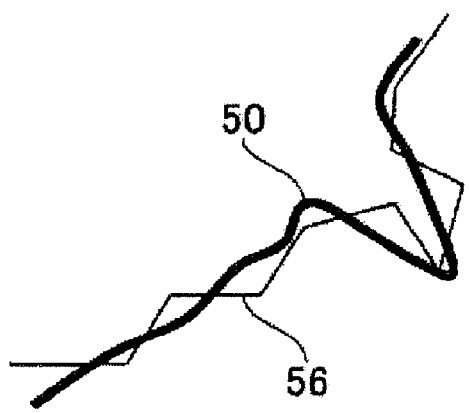

FIGS. 7(A) and (B) show an example of an elemental structure block 30, where the direction of the direction vector 42 assigned to a branch 34 is not equal to the direction of the trunk 32 nor to the direction of the branch 34 itself. FIG. 7 (C) shows an example of an arrangement of the blocks 30 shown in FIGS. 7(A) and (B) on a target curve 50. FIG. 7(D) shows the broken lines 56 formed by the branches selected at the blocks 30 of FIG. 7(C) during the encoding process. FIG. 7(E) shows the output binary sequence associated with the arrangement of the blocks 30 of FIG. 7(C).

In the above, the encoding system 10 could also generate data which describe the more precise conformation of a curve 50 using shorter intervals. For example, the length of the branches 32 may be equal to the length of the trunk 32 and the intervals between successive points 52 may be equal to or shorter than the length of the trunk 32. Then, the encoding system 10 could generate broken lines 56, which approximate the conformation of the curve 50, by connecting the selected branches 34 of the blocks 30 arranged on the curve 50 in the order that the corresponding points 52 occur on the curve 50. The encoding system 10 may generates data which describe the broken lines 56, using the data which describe the length, position, and orientation of the selected branches 34 of the blocks 30 arranged on the curve.

Figure 8:
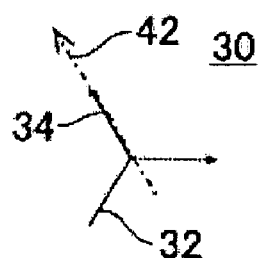
FIGS. 8(A)-8(E) show an example of an elemental structure block 30, an arrangement, broken lines 56 and an output binary sequence thereof, where the direction of the direction vector 42 assigned to a branch 34 is equal to the direction of the branch 34 itself.
Figure 8:
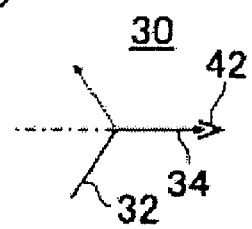
Figure 8:
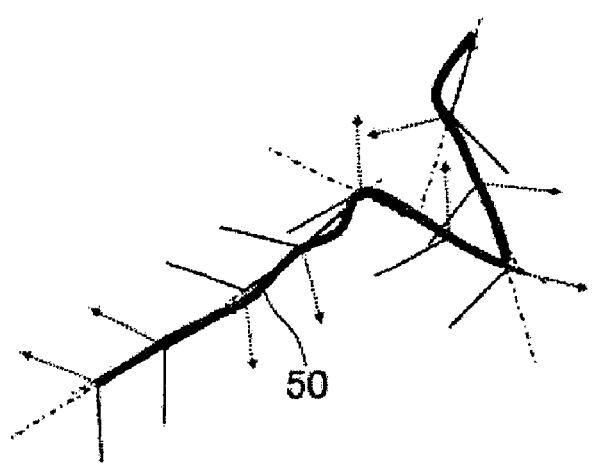
Figure 8:
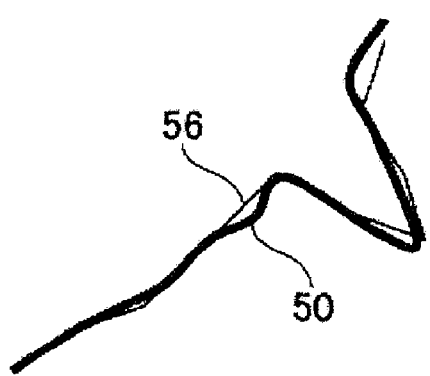

FIGS. 8(A) and (B) show an example of an elemental structure block 30, where the direction of the direction vector 42 assigned to a branch 34 is equal to the direction of the branch 34 itself. FIG. 8(C) shows an example of an arrangement of the blocks 30 shown in FIGS. 8(A) and (B) on a target curve 50. FIG. 8(D) shows the broken lines 56 formed by the branches selected at the blocks 30 of FIG. 8(C) during the encoding process. FIG. 8(E) shows the output binary sequence associated with the arrangement of the blocks 30 of FIG. 8(C).

The encoding system 10 may uses an elemental structure block 30 whose branches 34 are assigned a direction vector 42 whose direction is equal to the direction of the branch 34 itself. Then, the direction of the selected branch 34 becomes parallel to the direction of the gradient vector of the curve 50 at the corresponding point 50, after the adjustment step S17. In general, using a block 30 whose branches 34 are assigned a direction vector 42 whose direction is closer to the direction of the branch 34 itself, the encoding system 10 could generate data which describe more precise variation of the gradient of the curve 50: the closer, the more precise. That is, by bringing the direction of the direction vector 42 of the branches 34 of a block 30 closer to the direction of the branch 34 itself, one could adjust the sensitivity of the output of the encoding system 10 to variation of the gradient of a target curve 50.

Figure 9:
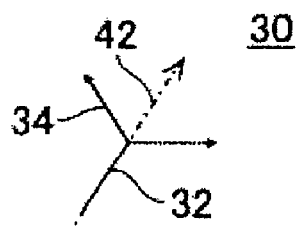
FIGS. 9(A)-9(E) show an example of an elemental structure block 30, an arrangement, broken lines 56, and an output binary sequence thereof, whose branches 34 are assigned a direction vector 42 whose direction is equal to the direction of the trunk 32.
Figure 9:
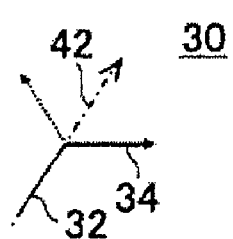
Figure 9:
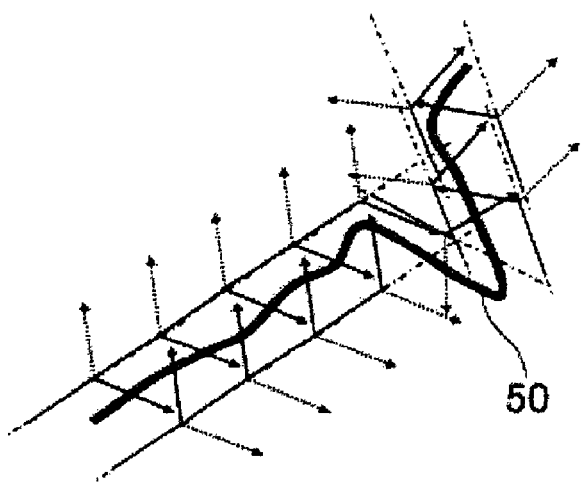
Figure 9:
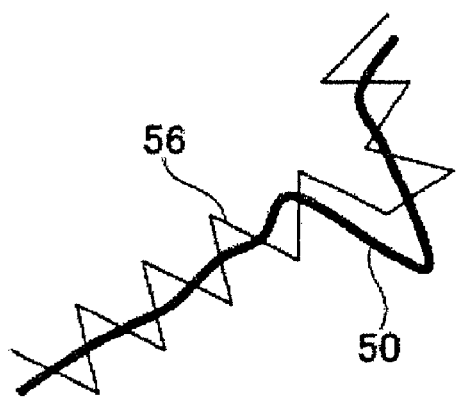

FIGS. 9(A) and (B) show an example of an elemental structure block 30 whose branches 34 are assigned a direction vector 42 whose direction is equal to the direction of the trunk 32. FIG. 9(C) shows an example of an arrangement of the blocks 30 shown in FIGS. 9(A) and (B) on a target curve 50. FIG. 9(D) shows the broken lines 56 formed by the branches selected at the blocks 30 of FIG. 9(C) during the encoding process. FIG. 9(E) shows the output binary sequence associated with the arrangement of the blocks 30 of FIG. 9(C).

The encoding system 10 may uses an elemental structure block 30 whose branches 34 are assigned a direction vector 42 whose direction is equal to the direction of the trunk 32. Then, the direction of the selected branch 34 becomes farther from the direction of the gradient vector of the curve 50 at the corresponding point 50, after the adjustment step S17. In general, using a block 30 whose branches 34 are assigned a direction vector 42 whose direction is closer the direction of the trunk 34, the encoding system 10 could generate data which describe variation of the gradient of a curve 50 less precisely: the closer, the less precise. That is, by bringing the direction of the direction vector 42 of the branches 34 of a block 30 closer to the direction of the trunk 34, one could adjust the sensitivity of the output of the encoding system 10 to variation of the gradient of a target curve 50.

FIGS. 10(A) and (B) show another example of an elemental structure block 30 which is used to encode the conformation of curves in three-dimensional Euclidean space (i.e., space curves). FIG. 10(C) shows the block 30, where the first branch 34-1 is selected (in step S16). FIG. 10(D) shows the block 30, where the second branch 34-2 is selected (in step S16).

The elemental structure block 30 embodying the second embodiment of the invention is a three-dimensional object with a trunk 32 and two branches 34; the first one 34-1 and the second one 34-2. The trunk 32 is a cylinder shaped object of predetermined length. And the trunk 32 has a tiny projection 72 which indicates the rotational orientation of the trunk 32.

The two branches 34 are also cylinder shaped objects of predetermined length. For example, they may have the same shape as the trunk 32. The branches 34 are joined to the same end 36 of the trunk 32 via an end point. The first branch 34-1 and the trunk 32 form a predetermined angle. And the second branch 34-2 and the trunk 32 also form the same predetermined angle. But the two branches 34 are placed in different positions from each other. For example, the predetermined angle formed by the first branch 34-1 and the trunk 32 may be 120 degrees. The predetermined angle formed by the second branch 34-2 and the trunk 32 may be also 120 degrees. And the first branch 34-1 and the second branch 34-2 may form an angle of 90 degrees. Moreover, each of the two branches 34 has a tiny projection 74 which indicates the rotational orientation of itself, the first projection 74-1 for the first branch 34-1 and the second projection 74-2 for the second branch 34-2.

The elemental structure block 30 embodying the second embodiment is also assigned direction vectors 42 for each of the branches 34; the first direction vector 42-1 is assigned to the first branch 34-1 and the second direction vector 42-2 is assigned to the second branch 34-2. The first direction vector 42-1 goes through the center point 36 of the block 30 and forms predetermined angles with the trunk 32 and the first branch 34-1, as shown in FIG. 10(C). The second direction vector 42-2 also goes through the center point 36 of the block 30 and forms predetermined angles with the trunk 32 and the second branch 34-2, as shown in FIG. 10(D). The first direction vector 42-1 specifies the direction of the block 30 when the first branch 34-1 is selected in step S16. And the second direction 42-2 vector specifies the direction of the block 30 when the second branch 34-2 is selected in step S16.

Furthermore the two branches 34 of the block 30 are assigned different codes; one is assigned code 0 and the other is assigned code 1. Then, the encoding system 10 could generate a binary sequence of 0 and 1 which describes the conformation of a given space curve, using the block 30 described above.

The elemental structure block 30 embodying the second embodiment may be specified by a set of data which include the length, position, direction, and rotational orientation (specified by the projection 72) of the trunk 32, the length of the branches 34, the relative position and direction 32, and rotational orientation (specified by the projection 74) of the branches 34 with respect to the trunk 32, the spacial orientation of direction vectors 42 with respect to the trunk 32 and the branches 34, and the codes assigned to the branches 34. The encoding system 10 may encode a space curve, using the data which specify the block 30 embodying the second embodiment.

Figure 10:
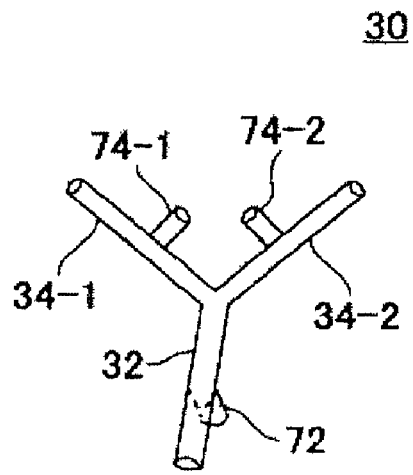
FIGS. 10(A)-10(D) show another example of an elemental structure block 30 which is used to encode the conformation of space curves.
Figure 10:
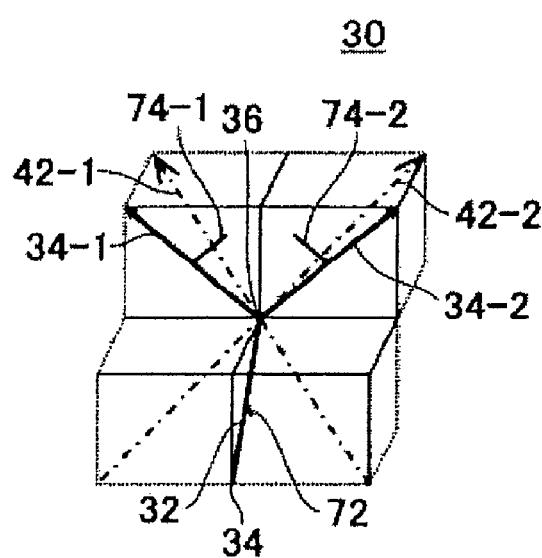
Figure 10:
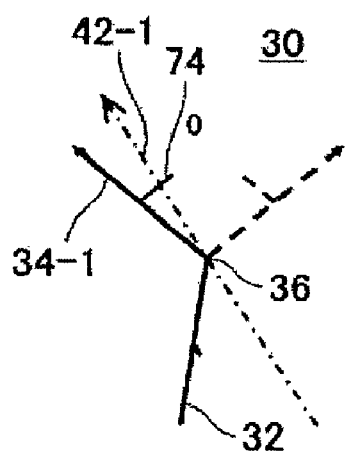
Figure 10:
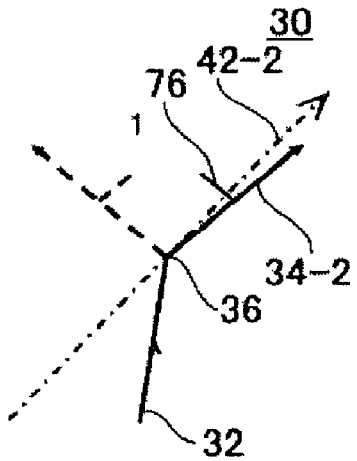
Figure 11:
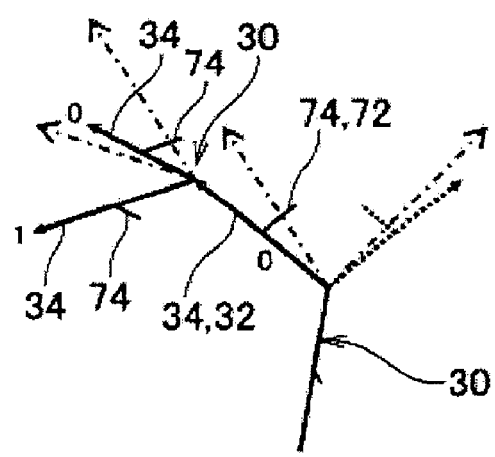
FIGS. 11(A) and 11(B) show an example of adjustment of spacial orientation of the block 30 shown in FIGS. 10(A)-10(D)
Figure 11:
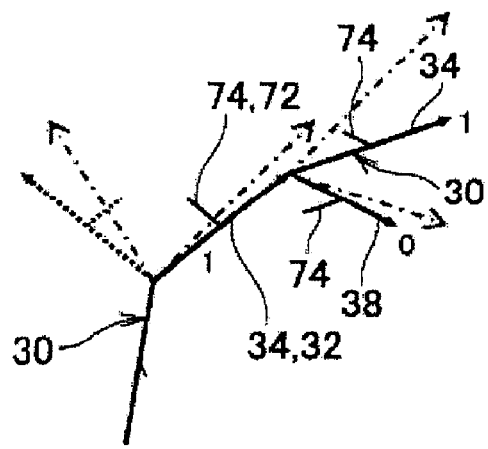

FIGS. 11(A) and (B) show an example of adjustment of spacial orientation of the block 30 shown in FIG. 10. The adjustment module 22 adjusts spacial orientation of blocks 30, just after selection of the most appropriate branch 34 of a block 30 assigned to the current representative point 54 (current block) and before selection of the most appropriate branch of the block 30 assigned to the next representative point 52 (next block), in such a way that the direction and rotational orientation of the trunk 32 of the next block 30 coincide with the predetermined direction (direction vector) and rotational orientation of the selected branch 34 of the current block 30.

In the case of the block 30 of FIG. 10, the adjustment module 22 firstly arranges the current and the next blocks 30 in such a way that the direction of the trunk 32 of the next block 30 and the direction of the selected branch 34 of the current block 30 coincide. Then, the adjustment module 22 adjusts the rotational orientation of the next block 30 in such a way that the rotational orientation of the trunk 32 of the next block 30 specified by the projection 72 and the rotational orientation of the selected branch 34 of the current block 30 specified by the projection 74 coincide.

As described above, the adjustment module 22 could specify spacial orientation of the block 30 placed on the next representative point uniquely. And the encoding system 10 could generate a binary sequence of 0 and 1 which describes the three-dimensional conformation of a given space curve, using the block 30 shown in FIG. 10.

Figure 12:
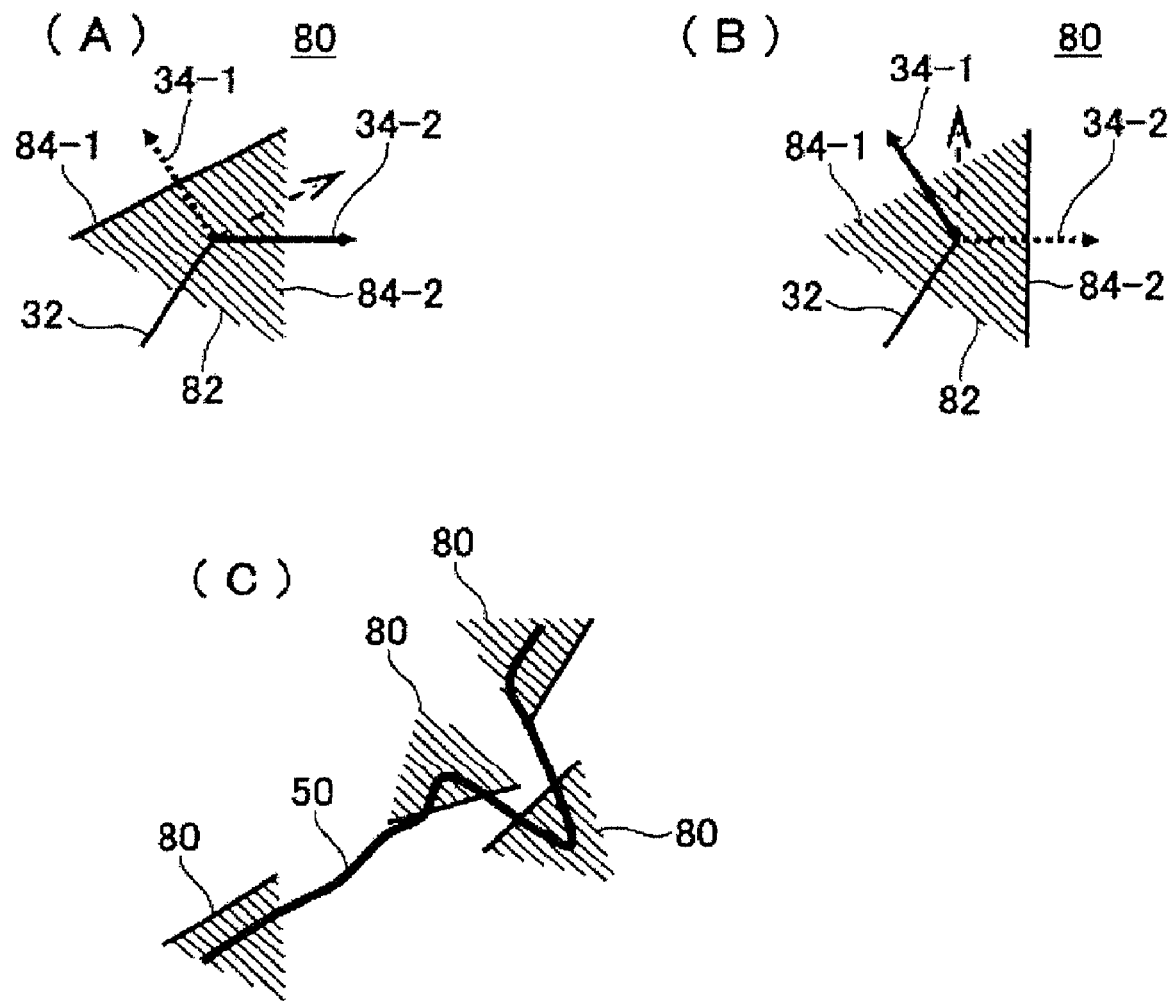
FIGS. 12(A) and 12(B) show an example of the elemental structure block 30 shown in FIG. 2, a triangle tile 80.
FIG. 12(C) shows an example of an arrangement of the triangle tiles 30 shown in FIGS. 12(A) and 12(B) on a target curve 50.

FIGS. 12(A) and (B) show an example of the elemental structure block 30 shown in FIG. 2; a triangle tile 80. FIG. 12(C) shows an example of an arrangement of the triangle tiles 30 shown in FIGS. 12(A) and (B) on a target curve 50. The encoding system 10 may encode the two-dimensional conformation of a plane curve 50, using the triangle tiles 30 as elemental structure block 30.

The triangle tile 30 is an equilateral triangle composed of a base 82 and two sides 84, the first one 84-1 and the second one 84-2. The base 82 is perpendicular to the trunk 32 of the block 30 shown in FIG. 2. The first side 84-1 is perpendicular to the first branch 34-1 of the block 30 shown in FIG. 2. And the second side 84-2 is perpendicular to the second branch 34-2 of the block 30 shown in FIG. 2. Moreover, the center 80 of the tile 80 may coincide with the connection point of the trunk 32 and the branches 34 of the block 30 shown in FIG. 2.

The arrangement module 18 arranges the triangle tiles 80 on the representative points of the given curve 50. And the branch selection module 20 selects the side 84 whose direction is closer to the gradient vector 54 of the curve 50 at the corresponding point than that of the other side 84. Then, the code assigned to the branch 34 which corresponds to the selected side 84 is stored. In this way, the encoding system 10 could generate a binary sequence of 0 and 1 which describes the two-dimensional conformation of a given plane curve. The encoding system 10 may also generate broken lines which approximate the given curve by arranging the selected sides 84 in the order they are selected.

Figure 13:
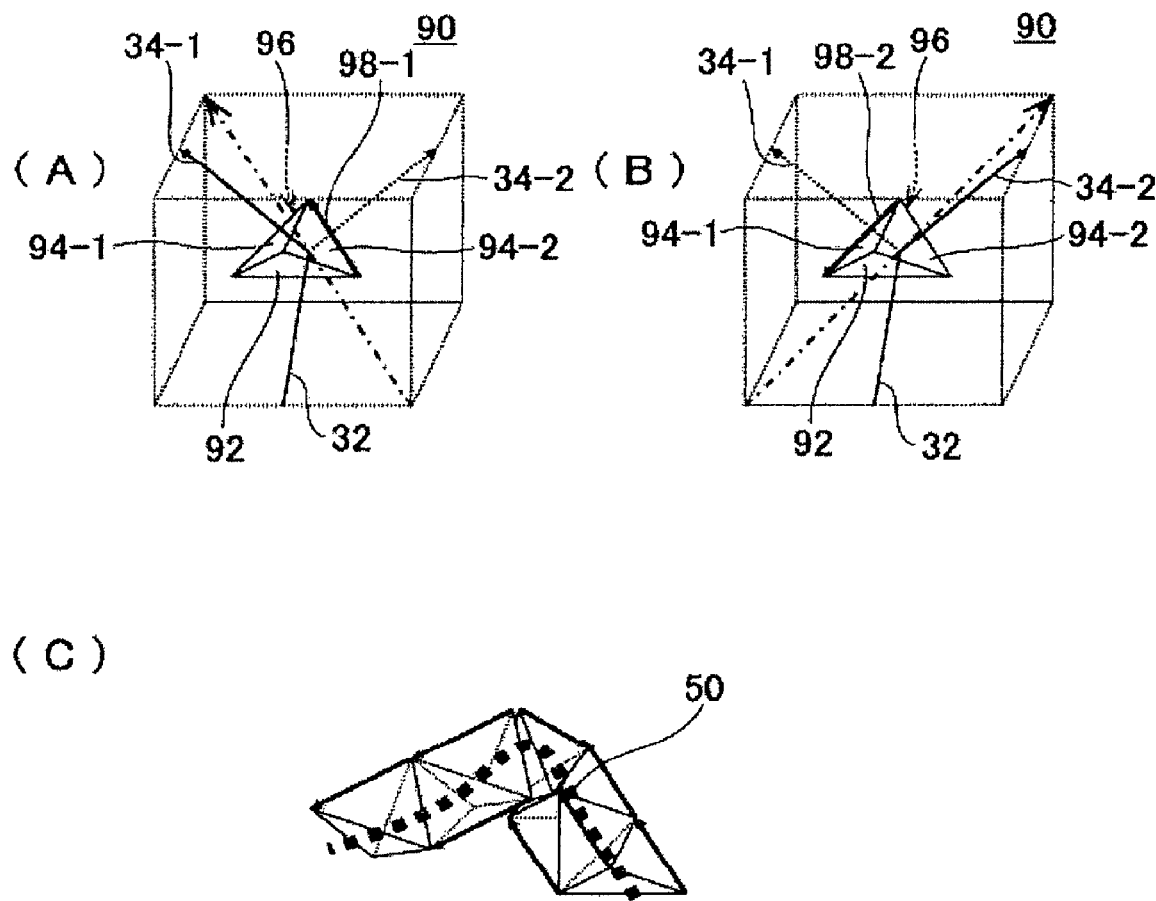
FIGS. 13(A) and 13(B) show an example of the elemental structure block 30 shown in FIG. 10, a tetrahedron block 90.
FIG. 13(C) shows an example of an arrangement of the tetrahedron blocks 30 shown in FIGS. 13(A) and 13(B) on a target curve 50.

FIGS. 13(A) and (B) show an example of the elemental structure block 30 shown in FIG. 10; a tetrahedron block 90. FIG. 13(C) shows an example of an arrangement of the tetrahedron blocks 30 shown in FIGS. 13(A) and (B) on a target curve 50. The encoding system 10 may encode the three-dimensional conformation of a space curve 50, using the tetrahedron blocks 30 as elemental structure block 30. The tetrahedron block 90 consists of four faces; a base 92, two side faces 94 (the first side face 94-1 and the second side face 94-2), and a top 96. All of the four faces have the same shape; an isosceles triangle whose ratio of the length of the three sides is given by 2: square root of 3: square root of 3.

The base 92 is perpendicular to the trunk 32 of the block 30. The first face 94-1 is perpendicular to the first branch 34-1 of the block 30. The second face 94-2 is perpendicular to the second branch 34-2 of the block 30. The first side face 94-1 and the base 92 share one of the two shorter sides of them. The first side face 94-1 and the second side face 94-2 share the longer side of them. The second side face 94-2 and the base 92 share one of the two shorter sides of them. The second side face 94-2 and the first side face 94-1 share the longer side of them.

Moreover, the tetrahedron block 90 has two direction edges 98, the first direction edge 98-1 and the second direction edge 98-2. The first direction edge 98-1 corresponds to the direction vector of the first branch 34-1 of the block 30 shown in FIG. 10. And the edge 98-1 is the edge of the block 90 which is not included in the base 92 nor the first side face 94-1. The second direction edge 98-2 corresponds to the direction vector of the second branch 34-2 of the block 30 shown in FIG. 10. And the edge 98-2 is the edge of the block 90 which is not included in the base 92 nor the second side face 94-2.

The arrangement module 18 arranges the tetrahedron blocks 90 on the representative points of the given curve 50. And the branch selection module 20 selects the direction edge 98 whose direction is closer to the gradient vector 54 of the curve 50 at the corresponding point than that of the other edge 98. Then, the code assigned to the branch 34 which corresponds to the selected edge 98 is stored. In this way, the encoding system 10 could generate a binary sequence of 0 and 1 which describes the three-dimensional conformation of a given space curve. The encoding system 10 may also generate a sequence of tetrahedron blocks 90 which approximates the given curve by arranging the blocks 90 in the order they are selected.

Figure 14:
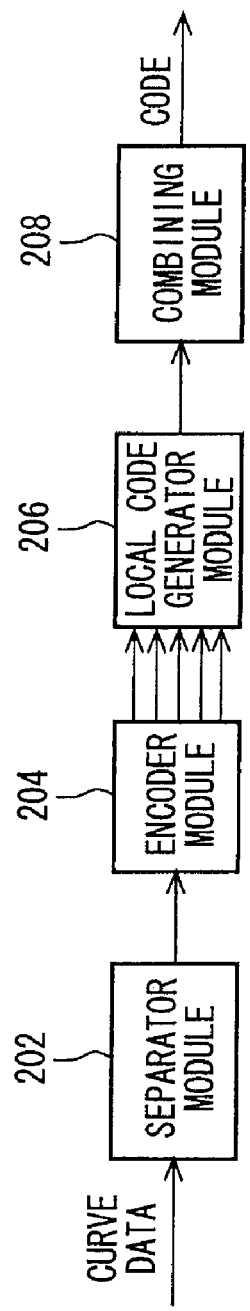
FIG. 14 shows an example of the encoding system 10 embodying a variant embodiment of the invention.

FIG. 14 shows an example of the encoding system 10 embodying an alternative embodiment of the invention. The encoding system 10 has a separator module 202, an encoder module 204, a local code generator module 206, and a combining module 208. The separator module 202 generates a set of fragments of a target curve, where neighboring fragments overlap and the curve is fully covered by the set of fragments. For example, the separator module 202 may generates data which specify the two- or three-dimensional coordinates of the points on fragments of the target curve, where neighboring fragments overlap and the curve is fully covered by the set of fragments.

The encoder module 204 has the same organization and function as those of the encoding system 10 shown in FIG. 1. And the encoder module 204 encodes each of the fragments generated by the separator module 202 to generate data, such as a binary sequence, which describes the conformation of the fragment. The encoder module 204 encodes a fragment by arranging elemental structure blocks 30 on the fragment in such a way that the selected branch 34 of a block 30 and the trunk 32 of the next block 30 overlaps. Moreover, the encoder module 204 may generate more than one set of data, which describe the conformation of the given fragment, for each fragment. For example, the encoder module 204 may generate different data which describe the conformation of the same fragment using a different first representative point and/or different spacial orientations of the blocks 30.

The local code generator module 206 generates a code of a given fragment which describe the conformation of the fragment (local code), using the data obtained above. For example, the local code generator module 206 may output all the set of data it generates for the fragment, as a code of the fragment.

The combining module 208 generates a code which describes the conformation of the whole target curve, using the codes of the fragments obtained above. For example, the combining module 208 may output a set of local codes coupled with the position of the corresponding fragment, as a code of the curve 50.

Spacial orientation of a particular block 30 depends on that of the preceding block 30, when the encoder module 204 encodes a fragment by arranging the blocks 30 on the fragment in such a way that the selected branch 34 of a block 30 and the trunk 32 of the next block 30 overlaps. Therefore, in this case, one could not compute partial similarity of two curves, using the code generated by the encoding system 10 because code of a fragment is not determined uniquely. But you could use codes generated by the encoding system 10 embodying the variant embodiment described above to compute partial similarity of curves because the encoding system 10 generates a variety of codes for each of the fragments which describe the conformation of the same fragment.

Figure 15:
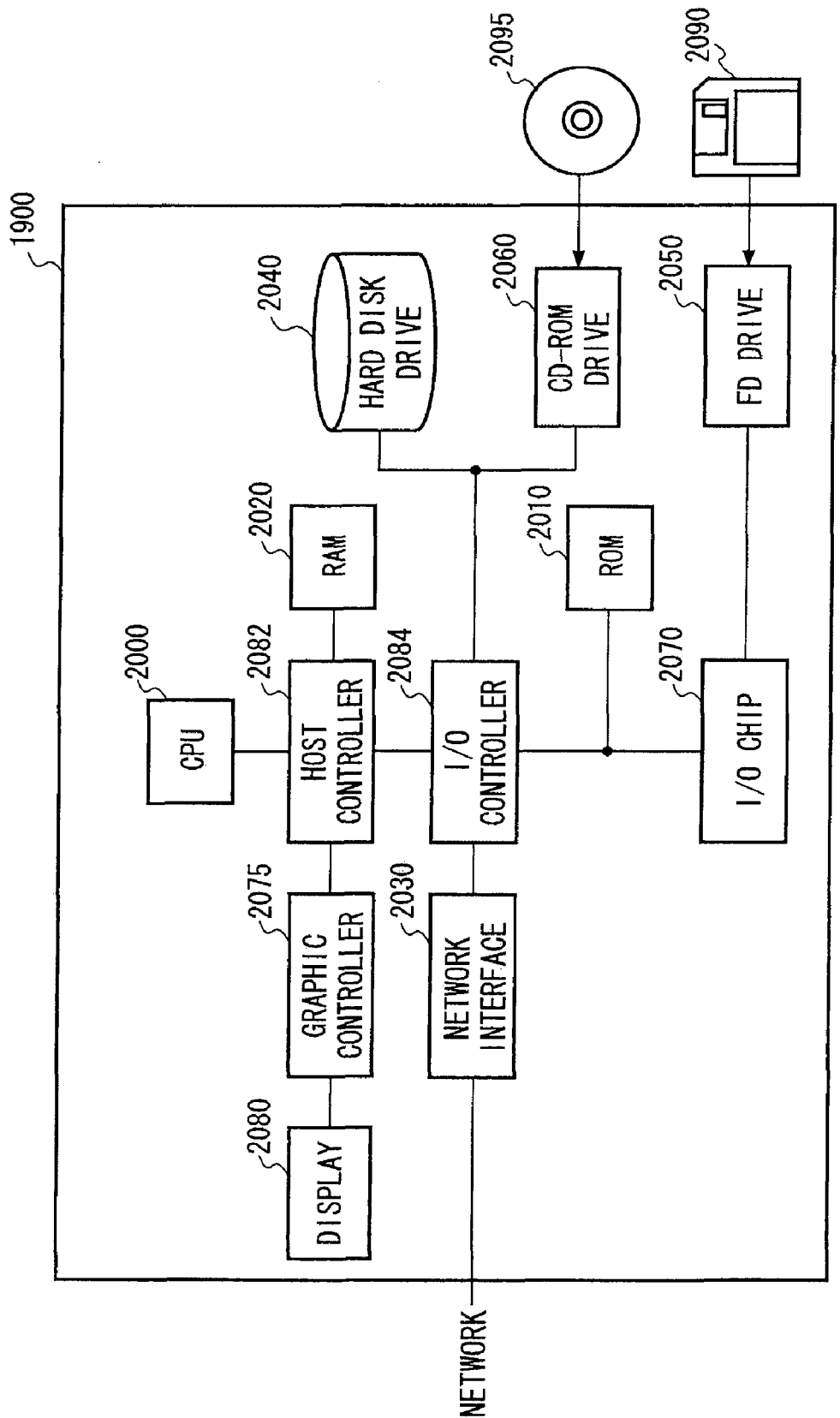
FIG. 15 shows a hardware organization of a computer system 1900 which is used in the embodiment.

FIG. 15 shows a hardware organization of a computer system 1900 which embodies the embodiments described above. The computer system 1900 is equipped with a CPU part composed of a CPU 2000, a RAM 2020, a graphic controller 2075, and a display 2080, all of which are connected to each other by a host controller 2082. The computer system 1900 is also equipped with an interface part composed of a network interface 2030, a hard disk drive 2040, and a CD-ROM drive 2060, all of which are connected to the host controller 2082 by an I/O controller 2084. The computer system 1900 is also equipped with a legacy I/O part composed of a ROM 2010, a FD (flexible desk) drive 2050, and an I/O chip 2070, all of which are connected to the I/O controller 2084.

The host controller 2082 is connected to the RAM 2020, the CPU 2000 which transfers data to/from the RAM 2020 with high-throughput, and a graphic controller 2075. The CPU 2000 controls the system 1900, executing programs stored in the ROM 2010 and the RAM 2020. The graphic controller 2075 loads image data and put it in a frame buffer which is allocated by the CPU 2000 in the RAM 2020 to display the image on the display 2080. Or the graphic controller 2075 may provides a frame buffer for the CPU 2000 and others instead of the CPU 2000.

The I/O controller 2084 is connected to the host controller 2082, the network interface 2030, the hard disk drive 2040, and CD-ROM drive 2060. The network interface 2030 communicates with other devices over network. The hard desk drive 2040 stores programs and data which are executed or used by the CPU 2000. The CD-ROM drive 2060 loads programs and data from a CD-ROM 2095 and transfer them to the hard disk drive 2040 via the RAM 2020.

The I/O controller 2084 is also connected to the ROM 2010, the FD drive 2050, and the I/O chip 2070, all of which transfer data with relatively low throughput. The ROM 2010 stores a boot program, which is executed by the CPU when the computer system 1900 is started, and other hardware-dependant programs. The FD drive 2050 load programs and data from a FD disk 2090 and transfer them to the hard disk drive 2040 via the RAM 2020. The I/O chip 2070 is connected to a various kind of devices via the FD drive 2050, a parallel port, a serial port, a keyboard port, a mouse port, or others.

Users provide programs stored in the hard disk drive 2040, using removable storage media, such as a FD disk 2090, a CD-ROM 2095, and an IC card. And the CPU 2000 loads the programs from the hard disk drive 2040 and executes them.

The program executed by the computer system 1900 to implement the encoding system 10 includes an input routine, a point selection routine, a gradient vector generator routine, an arrangement routine, a branch selection routine, an adjustment routine, and a code generator routine. And the computer system execute these routines and others to implement the input module 12, a point selection module 14, a gradient vector generator module 16, an arrangement module 18, a branch selection module 20, an adjustment module 22, and a code generator module 24 of the encoding system 10.

The program executed by the computer system 1900 to implement the variant embodiment of the encoding system 10 described above has a separator routine, a encoder routine, local code generator routine, and a combining routine. And the computer system executes these routines and others to implement the separator module 202, the encoder module 204, the local code generator module 206, and the combining module 208 of the variant embodiment.

The programs and modules described above may be store in external storage media. The external storage media includes not only FD disks 2090 and CD-ROMs 2095 but also optical storage media such as DVDs and CDs, optical-magnet storage media such as MOs, tapes, IC cards, semiconductor memory such as IC cards. Or the program may be provided to the computer system 1900 via network.

As clearly indicated by the above description, an embodiment of the present invention can easily achieve a test apparatus and an electronic device enabling low-speed and high-speed devices to be tested with a single test apparatus. Also, an embodiment of the present invention can easily achieve a test apparatus and an electronic device enabling a device having both low-speed and high-speed sections to be tested.

What is claimed is:

1. A non-transitory computer readable medium storing thereon a program for encoding the conformation of a given curve, the encoding program comprising:
   a point selection module for selecting representative points on a given curve;
   an arrangement module for putting an elemental structure block which consists of a trunk and branches, where each branch is connected to the same end point of the trunk in a predetermined configuration and assigned a different code, on each of the representative points in such a way that the connection point of the trunk and branches of the block coincides with the position of the corresponding representative point;
   a branch selection module for selecting a branch from each of the blocks arranged above, successively along the curve starting from the first representative point to the last representative point, which represents the gradient of the curve at the corresponding representative point most appropriately;
   an adjustment module for adjusting spacial orientation of the elemental structure blocks arranged above, just after selection of the most appropriate branch of a block (current block) and before selection of the most appropriate branch of the block assigned to the next representative point (next block), in such a way that the direction and rotational orientation of the trunk of the next block coincide with the predetermined direction and rotational orientation assigned to the selected branch of the current block; and
   a code generator module for generating data which describe the conformation of the curve, using the code of the selected branches of the elemental structure blocks assigned to the representative points of the curve.

2. The computer readable medium as set forth in claim 1, wherein each branch of an elemental structural block is assigned a direction which is different from the direction of itself.

3. The computer readable medium as set forth in claim 2, wherein an elemental structure block has two branches, one of which is assigned code 0 and the other is assigned code 1, and the code generator module generates a binary sequence that is obtained by arranging the codes of the selected branches in the order that the corresponding representative points occur on the curve.

4. The computer readable medium as set forth in claim 3, wherein an elemental structure block has two branches whose length is the same as the length of the trunk, where the angle formed by the two branches is 90 degrees and the angles formed by the trunk and each of the branches are 120 degrees.

5. A system for encoding a curve comprising:
   a point selection module for selecting a plurality of representative points disposed along the curve;
   an arrangement module for arranging a plurality of elemental structure blocks at the representative points, each of the elemental structure blocks corresponding to the respective one of the representative points, each of the elemental structure blocks comprising:
   a trunk, and
   a plurality of branches, each of which being attached to an end point of the trunk at a predetermined angular configuration and having a different code assigned, the end point of the trunk generally overlapping with each of the representative points;
   a branch selection module for selecting a branch closest to the gradient vector at respective one of the representative points from the plurality of branches included in the current elemental structure block corresponding to the respective one of the representative points, the branch selection being performed sequentially from one representative point to another along the curve;
   an adjustment module for adjusting a direction and a rotational angle of a next elemental structure block, a direction and rotational angle of the trunk arranged at the next representative point generally coinciding with a designated direction and rotational angle predetermined for the selected branch, the adjustment being performed after the branch selection module selecting the branch arranged at the current representative point and before the branch selection module selecting the branch arranged at the next representative point; and
   a code generator module for generating data representing the curve by using the assigned codes of the selected branches.

6. The system as set forth in claim 5, wherein each direction of the branches is different from the designated direction for the selected branch.

7. The system as set forth in claim 5, wherein each elemental structure block comprises at least one branch to which 0 is assigned as code and at least one branch to which 1 is assigned as code.

8. The system as set forth in claim 7, wherein the code generator module outputs data obtained by combining the codes assigned to the branches sequentially selected for each elemental structure block along the curve.

9. The system as set forth in claim 5, wherein the trunk and two of the branches of each elemental structure block have substantially the same length, and wherein the trunk has approximately 120 degrees with respect to each of the two branches, while one of the two branches has approximately 90 degrees with respect to the other branch.

10. The system as set forth in claim 5, wherein the curve is provided as data represented in a two-dimensional or a three-dimensional coordinate system.

11. The system as set forth in claim 5, wherein the gradient vector comprises a vector being disposed in parallel with a tangent line at the first representative point along the curve, the vector representing a direction from the current representative point to the next representative point.

12. The system as set forth in claim 5, wherein the plurality of representative points are continuously selected along the curve.

13. The system as set forth in claim 5, wherein the plurality of representative points are discretely selected along the curve.

14. The system as set forth in claim 5, wherein each of the elemental structure blocks comprises a trunk and two branches.

15. The system as set forth in claim 14, wherein the elemental structure block is formed in a triangle tile.

16. The system as set forth in claim 14, wherein the elemental structure block is formed in a tetrahedron block.

17. A method for encoding a curve comprising:

preparing the curve as a target to be encoded;

selecting a plurality of representative points disposed along the curve;

calculating a plurality of gradient vectors, each of which corresponding to the respective one of the representative points;

providing a plurality of elemental structure blocks, each of which comprising a trunk and a plurality of branches, each branch being attached to an end point of the trunk at a predetermined angular configuration, each of the branch having a direction vector;

arranging a first elemental structure block, which corresponding to a first representative point, the end point for the first elemental structure block generally overlapping with the first representative point;

selecting a branch closest to a first gradient vector corresponding to the first representative point among the branches included in the first elemental structure block;

adjusting a direction and a rotational angle of the selected branch, the direction vector of which generally coinciding with the first gradient vector;

adjusting a direction and a rotational angle of a branch of a second elemental structure block to be selected, the direction of the trunk included in the second elemental structure block generally coinciding with the direction of the selected branch included in the first elemental structure block;

assigning codes to the branches included in the second elemental structure block, the branches having a different code from each other;

repeating from the first elemental structure block arranging step to the code assigning step with respect to a next representative point disposed along the curve; and generating data representing the curve by using the assigned codes of the selected branches, wherein the method is performed using a processor or computer.

18. The method as set forth in claim 17, wherein the gradient vector comprises a vector being disposed in parallel with a tangent line at the first representative point along the curve, the vector representing a direction from the first representative point to the second representative point.

19. The method as set forth in claim 17, wherein the generated data comprises a binary sequence.

20. The method as set forth in claim 17, wherein the plurality of representative points are discretely selected along the curve.

* * * * *